United States Patent [19]
Inoue et al.

[11] Patent Number: 6,112,309
[45] Date of Patent: Aug. 29, 2000

[54] COMPUTER SYSTEM, DEVICE AND OPERATION FREQUENCY CONTROL METHOD

[75] Inventors: Tadanobu Inoue, Yamato; Kazuo Sekiya, Tokyo-to, both of Japan

[73] Assignee: International Business Machines Corp., Armonk, N.Y.

[21] Appl. No.: 09/038,882

[22] Filed: Mar. 11, 1998

[30] Foreign Application Priority Data

Apr. 23, 1997 [JP] Japan ..................................... 9-354283

[51] Int. Cl.[7] ................................ G06F 1/04; G06F 1/26; G06F 11/00
[52] U.S. Cl. ............................................ 713/501; 713/320
[58] Field of Search ................................... 713/320, 340, 713/502, 501, 321; 714/815

[56] References Cited

U.S. PATENT DOCUMENTS

| | | | |
|---|---|---|---|
| 5,416,726 | 5/1995 | Garcia-Duarte | 364/550 |
| 5,426,755 | 6/1995 | Yokouchi | 395/425 |
| 5,430,881 | 7/1995 | Ikeda | 395/750 |
| 5,546,568 | 8/1996 | Bland et al. | . |
| 5,590,280 | 12/1996 | Watanbe | 395/185.08 |
| 5,625,826 | 4/1997 | Atkinson | 395/750 |

FOREIGN PATENT DOCUMENTS

| | | | |
|---|---|---|---|
| 2-244312 | 9/1990 | Japan | . |
| 3-296119 | 12/1991 | Japan | . |
| 4-195316 | 7/1992 | Japan | . |
| 4-238517 | 8/1992 | Japan | . |
| 5-011897 | 1/1993 | Japan | . |
| 5-324117 | 12/1993 | Japan | G06F 1/04 |
| 60121158A | 1/1994 | Japan | G06F 1/32 |
| 8-083133 | 3/1996 | Japan | . |

OTHER PUBLICATIONS

Advanced Power Management BIOS Interface Specification, Revision 1.2, Feb. 1996.

*Primary Examiner*—Joseph E. Palys
*Assistant Examiner*—Willie Martin
*Attorney, Agent, or Firm*—David M. Shofi; Anne Vachon Dougherty

[57] ABSTRACT

The object of the present invention is to balance power saving and useability in a computer system. According to a first aspect of the present invention, when predetermined activities of a device in a computer system, each of which occurs within a predetermined period $t_1$ after the previous predetermined activity, succeed for a predetermined period $t_2$ or longer, a substantial frequency of a central processing unit is raised. According to a second aspect of the present invention, a substantial frequency of the CPU is raised after a disk drive has been accessed, and if a predetermined activity performed by a device other than the disk drive occurs within a predetermined period $t_4$ following the raise of the frequency, the substantial frequency of the CPU is lowered when a predetermined period $t_3$, following the predetermined activity, has passed.

23 Claims, 6 Drawing Sheets

COMPUTER SYSTEM, DEVICE AND OPERATION FREQUENCY CONTROL METHOD

FIELD OF THE INVENTION

The present invention relates to power management of a computer system, and more specifically to power management of a CPU (Central Processing Unit) that mainly uses CPU clock throttling.

BACKGROUND OF THE INVENTION

CPU clock throttling is described in U.S. Pat. No. 5,546,568. A first time interval during which a CPU operates at a predetermined frequency and a second time interval during which the CPU does not operate at all are alternately provided. The predetermined frequency is multiplied by the ratio of the first time interval to the sum of the two time intervals to obtain the substantial frequency of the CPU. For example, when a predetermined frequency is 100 MHz and the second time interval is 7 while the first time interval is 1, the substantial frequency is 12.5 MHz. The technique of CPU clock throttling is actually employed in a Pentium processor (trademark of Intel Corp.), which is a CPU produced by Intel Corp.

APM (Advanced Power Management) is employed as power management software. APM executes code for processing a power event by employing a special processor mode called a system management mode. The normal state, the standby state, the suspend state and the OFF state are defined by APM, and when a specific event occurs, the mode is shifted to an appropriate mode. An APM driver performs processing concerning the transition of the state and the system maintenance for state transition. For a detailed explanation, see Advanced Power Management (APM) BIOS Interface Specification Revision 1.2, Feb. 1996, Intel Corporation and Microsoft Corporation. Even software conforming to the provisions of APM tends to occupy a CPU for a predetermined period of time, regardless of whether or not there is a job to be executed. For example, even in an operating system, such as Windows 95 (Trademark of Microsoft Corp.), which conforms to the APM provisions, a device driver for a hard disk drive occupies the CPU during a wait period. Therefore, effective power management can not be performed by using only APM.

Japanese Unexamined Patent Publication No. Hei 3-296119 discloses an apparatus that comprises: detection means for detecting an access to an input/output device by a central processing unit; counting means for counting frequencies or the cycle of the access; and switching means for, in accordance with a result obtained by the counting means, switching at least one of the central processing unit and the accessed input/output device from an operational state to a low power consumption state. This publication describes an example wherein the number of times software accesses a keyboard buffer during a predetermined period is counted, and when an access count reaches a specified number, the CPU is halted; and an example wherein it is checked whether the CPU has accessed a VRAM to which display data for a display system is to be written, and when the VRAM has not been accessed within a specified period following the last recorded access, the display controller is halted and a display is erased and shifted to the low power consumption state.

Japanese Unexamined Patent Publication No. Hei 2-244312 discloses a portable information processor with low power consumption that includes communication means, and that normally halts the clock of as internally mounted CPU to initiate low power consumption and permits oscillation of the clock only when its operation is required. In this processor, a DMA function and a function for identifying the head and the end of a transfer block are provided for a circuit, and to consume less power, the clock of the CPU is halted even while communication is in progress.

Japanese Unexamined Patent Publication No. Hei 4-238517 discloses a control method whereby a power controller for powering peripheral hardware monitors an interval of an input/output to the peripheral hardware and an input/output count during a specific unit of time, and controls the power on or off of the peripheral hardware in accordance with the obtained results, so that battery power consumption is reduced as much as possible. In this embodiment, the power controller monitors, for a specific unit of time, an input/output count to a peripheral hardware. When the input/output count during the specific unit of time is less than the previous count, the non-communication monitoring period is extended. When the input/output count is greater, the non-communication monitoring period is shortened. When the non-communication monitoring period has ended following a specified input/output process and then a following input/output process is not performed, the power controller powers off the peripheral hardware.

Japanese Unexamined Patent Publication No. Hei 4-195316 discloses a technique wherein by monitoring a signal between a CPU and a device, an access detector detects the device being operated, that is, an access to the device by the CPU, then outputs an instruction signal to a controller in accordance with the detection to start providing power to the device or providing a clock signal to the device. This publication also describes the access detector that detects the reading by the CPU to one or more specific areas in a memory and outputs a signal for each specific area.

Japanese Unexamined Patent Publication No. Hei 5-11897 discloses a technique for setting a fast clock frequency for a specified period only when an I/O access operation occurs for which a fast clock is required.

Japanese Unexamined Patent Publication No. Hei 8-83133 discloses a technique whereby, when a CPU is to access a relatively slow I/O unit, such as a magneto optical disk drive, the CPU outputs an access request (IORQ) to an I/O controller, and during a predetermined period following the receipt of the IORQ, the I/O controller outputs a WAIT signal instructing the CPU to wait. This predetermined period is set in accordance with the response time from the I/O unit.

In addition, when a specific product sold on the market was examined, it was found that this product employs a method for raising the substantial frequency of a CPU for a specified period, such as several seconds following the issuance of a command to a hard disk, or 4 ms to 8 ms following the occurrence of an event, such as an interrupt from the hard disk. AS the result of the actual power consumed, when this method was employed for Windows95 (trademark of Microsoft Corp.) the following problems were noted. (1) The CPU was maintained in an accelerated state even while it was waiting for a response from the hard disk, and during this period a certain percentage of the total power consumed was wasted. (2) Windows95 adopts a time slice of 13.7 ms as a switching timing of a thread along which a hardware timer periodically issues an interrupt to a schedular in an operating system. Therefore, since, in an apparatus that employs a method for operating a CPU at a high speed for 8 ms for each interrupt, the CPU was operated at a high speed for 8 ms at the interval of 13.7 ms, the CPU was operated at a high speed almost all the time.

A method for resolving only the above problems may be provided by the above described background art; however, in the background art no method is provided whereby power management is balanced by usability.

It is, therefore, one object of the present invention to provide a power management method whereby power saving is balanced by useability.

SUMMARY OF THE INVENTION

According to a first aspect of the present invention, when predetermined activities of a device in a computer system, each of which occurs within a predetermined period $t_1$ after the previous predetermined activity, succeed for a predetermined period $t_2$ or longer, a substantial frequency of a central processing unit is raised. For example, the substantial frequency of the CPU is normally held low by CPU clock throttling, and when accesses to a frame buffer by a graphics device on purpose to modify the image (or an indirect access to a graphics device and/or a frame buffer or an access to a graphics device) occurs within a period of 100 μs after the previous one and succeed for 1 ms, the substantial frequency of the CPU is raised. Then, when there is little screen modification and the calculation ability of the CPU is not greatly required, an access to the frame buffer on purpose to modify the image does not satisfy the above described condition, and the substantial frequency of the CPU is maintained at a lower level by the CPU clock throttling. Even in this condition, the usability is not deteriorated and the amount of power consumed is not increased. When there is a large amount of screen modification and accesses to the frame buffer on purpose to modify the image occur succeedingly, the CPU must be operated at a high speed to provide the processing results a user desires, otherwise the user would experience some distress. Therefore, the usability has priority over to power saving and the substantial frequency of the CPU is raised.

In this case, the substantial frequency of the CPU may be lowered if a predetermined period $t_3$ has elapsed following the termination of the predetermined activities of the device in the computer system, each of which occurs within the predetermined period $t_1$ after the previous predetermined activity.

According to a second aspect of the present invention, a substantial frequency of a central processing unit is raised after an access to a disk drive, and if a predetermined activity performed by a device other than the disk drive occurs within a predetermined period $t_4$ following the increases of the substantial frequency, the substantial frequency of the central processing unit is lowered when a predetermined period $t_3$ following the predetermined activity has passed. Since there are a lot of cases where data to be processed by the CPU is read to a memory after an access to a disk drive, such as a hard disk drive or a CD-ROM drive, has been completed, the substantial frequency of the CPU is raised. Also, after the data have been read from the disk drive, a graphics device usually performs the processing for a display device, such as the accessing to a frame buffer on purpose to modify the image. Therefore, when an activity other than a disk access occurs within the predetermined period $t_4$ after an access to the disk drive, the substantial frequency of the CPU is maintained high until the end of the predetermined period $t_3$ is reached following the termination of the activity. As a result, a required process can be performed after the disk access, so that the usability will not be deteriorated. In addition, since the substantial frequency of the CPU is lowered by the CPU clock throttling that occurs during the disk access, power saving is also effected.

If the predetermined activity of the device other than the disk drive does not occur within the predetermined period $t_4$, the substantial frequency of the CPU is lowered at the end of the predetermined period $t_4$. This is because if no particular process necessary for a user occurs, only data read from the disk drive will be processed at a high speed, and thereafter a power saving will be performed.

In the second aspect of the present invention is described the processing performed when a predetermined activity performed by a device other than the disk drive occurs. The predetermined activity can be a set of activities performed by a device other than the disk drive, each of which occurs within the predetermined period $t_1$. This is the same as the first aspect of the present invention. Since if there is not much image to be rewritten the substantial frequency of the CPU is raised after an access to the disk drive, this is one variation so as to deal with a case where the computer system does not have to rewrite the image any more.

The first aspect of the present invention may be constituted by a device, or an apparatus, that comprises: a first counter for beginning to count a first predetermined value from a value at an initial state each time a device in a computer system performs a predetermined activity; a second counter for initializing a count value if the first counter has counted the first predetermined value, and for counting a second predetermined value while the first counter is counting the first predetermined value; and a controller for issuing a command to raise the substantial frequency of a central processing unit if the second counter has counted the second predetermined value. The second counter can be replaced by another second counter for initializing a count value if the first counter has counted the first predetermined value and for beginning to count the second predetermined value when the first counter begins to count from the value at the initial state before the first counter has counted the first predetermined value after the first counter has counted the first predetermined value and then again begins to count from the value at the initial state by the predetermined activity of the device. In another word, the first counter begins to count from a value at the initial state when the first counter isn't counting, then when the first counter resets to again begin to count before completing the previous count, the second counter begins to count the second predetermined value.

A third counter may be additionally provided for counting a third predetermined value in response to the first counter having counted the first predetermined value after the second counter has counted the second predetermined value, and the controller may issue a command to lower the substantial frequency of the central processing unit when the third counter has counted the third predetermined value.

The first through the third counters may either increment or decrement a value. Although an access to the frame buffer by the graphics device on purpose to modify the image has been explained, accesses are not thereby limited, and an access, by a device for performing MPEG compression or decompression to a device that stores MPEG data to be compressed or decompressed, or an access, by a communication device, to a device that stores communication data may be dealt with in the same way.

The second aspect of the present invention may comprise: a fourth counter for counting a fourth predetermined value from a value at an initial state in response to termination of an access to the disk drive; a controller for issuing a command to raise the substantial frequency of the CPU in response to the termination of the access to the disk drive; and wherein the third counter comprises a third counter for, if a predetermined activity of a device other than the disk drive occurs before the fourth counter has counted the fourth predetermined value, counting a third predetermined value from a value at an initial state when the predetermined activity has been completed. In this arrangement, in response to that the third counter has counted third predetermined value, the controller may issue a command to lower the substantial frequency of the CPU.

Further, additionally provided are a first counter for loading a first predetermined value and decrementing the first predetermined value each time a device other than a disk drive performs a predetermined activity; and a second counter for loading a second predetermined value if a count value of the first counter becomes 0, and for decrementing a count value while the count value of the first counter is not 0. And when the count value held by the second counter becomes 0, before the fourth counter has counted the fourth predetermined value, the third counter begins to count in response to that the count value of the first counter becomes 0. This corresponds to an example wherein, if the predetermined activity by the device performed within a predetermined period $t_4$ can be processed by first raising the substantial frequency of the CPU, no more raising of the substantial frequency will be performed.

When the count value of the first counter goes to 0 during the predetermined period $t_4$, the substantial frequency of the CPU can be held high during the period $t_4$. In this invention, CPU clock throttling is supposed to be employed; however, if a CPU can be operated by a plurality of types of clock frequencies, an actual input frequency may be raised or lowered.

While the arrangements of the present invention have been explained, the aspects of the present invention are not limited to a specific device, apparatus or computer system, and may be implemented by computer software or a memory medium for storing the software.

Generally, there is software for which enormous CPU power is required but that does not access a hard disk nor a screen, but such software is not primarily for use with current personal computers, in particular, notebook computers. The present invention, therefore, assumes that a situation exists where no such application software is available.

Advantage of the Invention

According to the present invention, one power management method whereby usability and power consumption can be balanced can be provided.

PREFERRED EMBODIMENT

Figure 1:
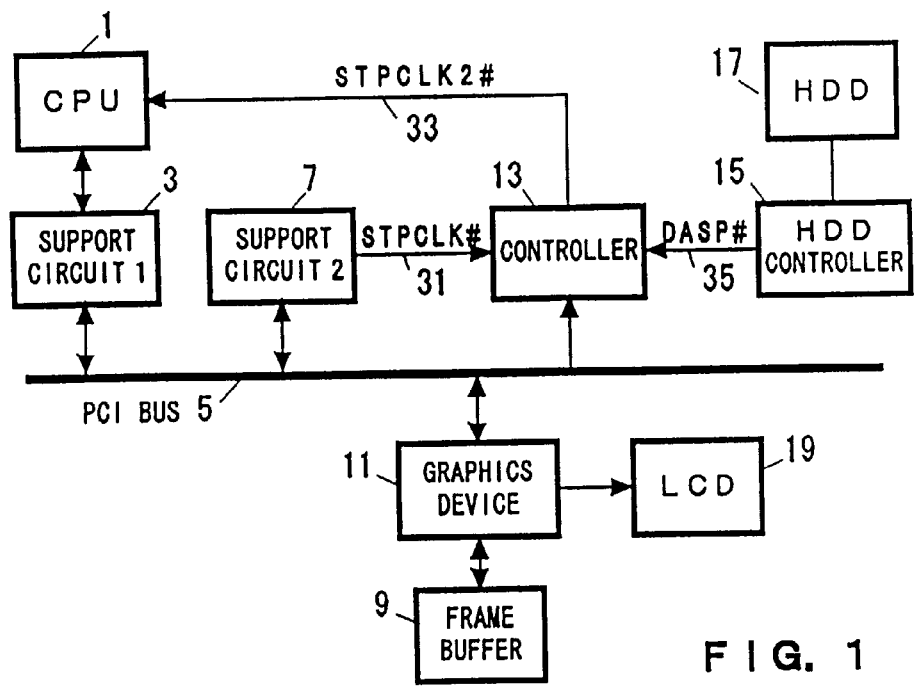
FIG. 1 is a block diagram illustrating an example arrangement using hardware according to the present invention.

FIG. 1 is a diagram illustrating an example arrangement of the present invention. A CPU 1 is connected with a controller 13, for controlling an operation related to the present invention, and a first support circuit 3. The controller 13 and the first support circuit 3, a second support circuit 7, and a graphics device 11 are connected to a PCI (Peripheral Component Interconnect) bus 5. The graphics device 11 is so connected that it can access a_frame buffer 9 and is also connected to an LCD (Liquid Crystal Display) 19. The controller 13 communicates with an HDD controller 15, which is connected to and controls an HDD (hard disk drive) 17. The second support circuit 7 and the controller 13 are connected together. The CPU 1 is, for example, a Pentium processor, which was mentioned previously. The first and the second support circuits are semiconductor chips included in a 82430TX chip set produced by Intel Corp., and the second support circuit 7 in particular corresponds to a chip called a PIIX4. The PCI bus 5 is used merely as an example, and a different bus type may be used. For the HDD controller 15 in this embodiment an IDE (Intelligent Drive Electronics) interface is used, but another interface type may be used. The structure of the controller 13 may be simplified if the HDD controller 15 can output such a signal that the controller 13 can detect at the time a Read/Write command is issued to the HDD controller 15 and when the final data transfer is completed.

FIG. 1 shows the existing condition when the HDD 17 is connected to the HDD controller 15. Not only the HDD 17, but also a disk drive, such as a CD-ROM drive or an MO drive that has a large memory capability, can be connected. Furthermore, it may be possible to connect two or more devices. Whether or not two or more devices can be connected depends on the capacity of the HDD controller 15 (or a disk drive controller). The graphics device 11 displays data on a display device, such as the LCD 19. Instead of the LCD 19, a CRT display may be employed. The frame buffer 9 may be one part of a main memory (not shown) or may be provided separately.

Although the controller 13 and the second support circuit 7 are separately provided in FIG. 1, the controller 13 can be included in the second support circuit 7.

The operation of the circuit shown in FIG. 1 will now be explained. The second support circuit 7 instructs to execute CPU clock throttling, and outputs a STPCLK# signal 31.

The STPCLK# signal 31 halts the operation of the CPU 1 during an assertion period (asserted period), and permits the operation of the CPU 1 during a de-assertion period (de-asserted period). With the second support circuit 7 of the previously described PIIX4, for example, when a TDP (Throttle Duty Programming) bit is set to 001b, the ratio of CPU operation time to CPU non-operation time is 1:7, and throttle duty is 12.5%. When 244 μs is defined as one unit, during a period of 30.5 μs the STPCLK# signal 31 is de-asserted and the CPU 1 is operated, and during the remaining period of 213.5 μs the STPCLK# signal is asserted and the CPU 1 is deactivated.

Under normal states, since the CPU 1 does not have much data to process, a large operation ratio for the assertion of the STPCLK# signal 31 by the second support circuit 7 is set because it provides greater power saving. The STPCLK# signal 31 is transmitted to the controller 13. The controller 13 monitors the bus cycle of the PCI bus 5 and a DASP# signal 35 that is output by the HDD controller 15. When, as a result, it is found that an event to be processed has occurred, the STPCLK# signal 31 received from the second support circuit 7 is modified and the resultant STPCLK2# signal 33 is transmitted to the CPU 1. The definition of the STPCLK2# signal 33 is the same as that of the STPCLK# signal 31.

The first support circuit 3, the graphics device 11, the HDD controller 15 and the HDD 17 perform a normal operation. Specifically, the graphics device 11 performs the data processing required for a display change on the LCD 19, as needed, and the HDD controller 15 accesses the HDD 17 as needed. As the operation of the first support circuit 3 is not directly related to the subject of the present invention, no explanation for it will be given.

Figure 2:
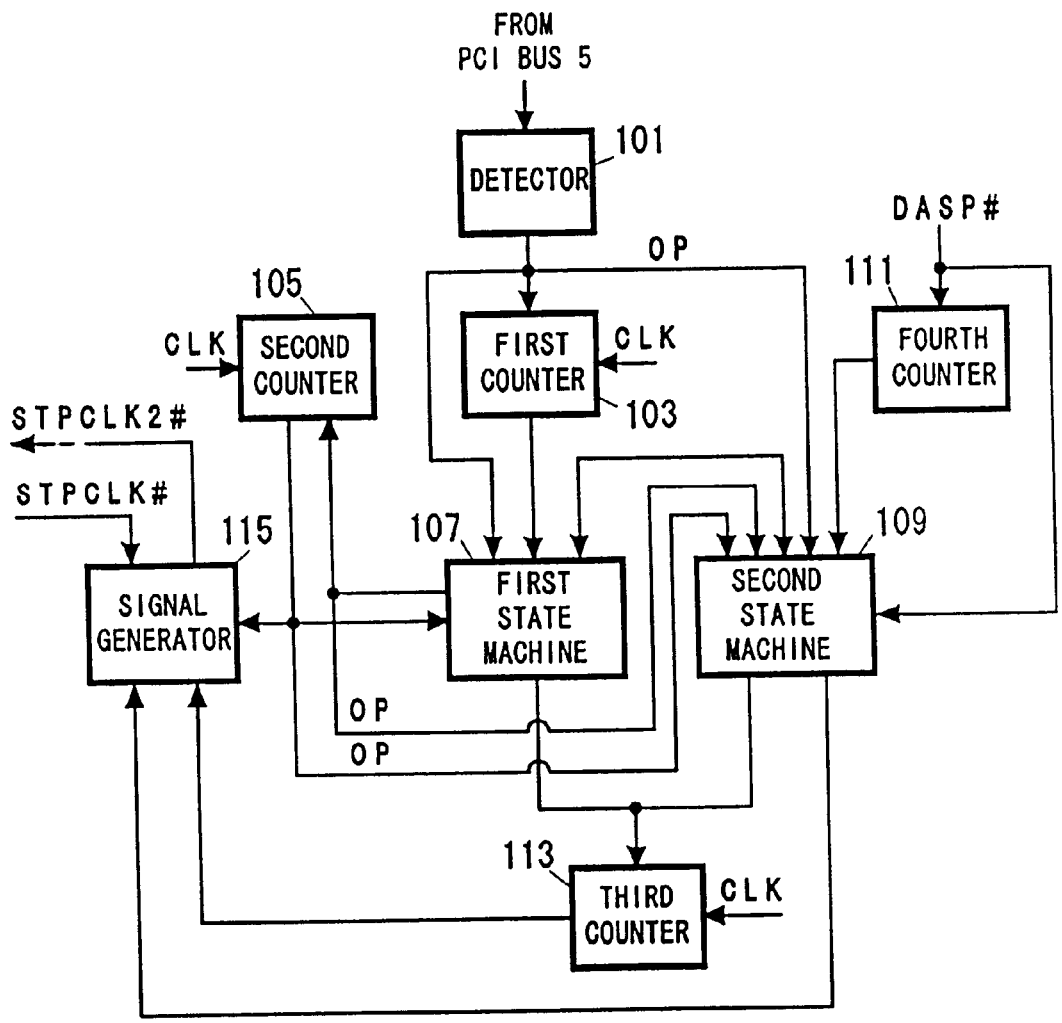
FIG. 2 is a block diagram illustrating an example arrangement of a controller 13 shown in FIG. 1.

FIG. 2 is a detailed diagram illustrating the controller 13 in FIG. 1. A detector 101 for monitoring the PCI bus 5 is connected to a first counter 103 and a first state machine circuit 107. The first counter 103 is connected to the first state machine circuit 107. The first state machine circuit 107 is connected to a second counter 105 and a second state machine circuit 109. The second counter 105 is connected to a signal generator 115, to which the STPCLK# signal 31 is transmitted. A signal line to the second state machine circuit 109 can be selected from a signal line transmitting a signal from the first state machine 107 to the second counter 105 to the second state machine 109, a signal line transmitting a signal from the second counter 105 to the signal generator 115 to the second state machine circuit 109, and a signal line transmitting the output of the detector 101 to the second state machine 109, or all of the three signal lines may be connected together. The first and the second state machine circuits 107 and 109 are connected to a third counter 113, which is connected to the signal generator 115. The DASP# signal 35 is transmitted by the HDD controller 15 to a fourth counter 111, which is connected to the second state machine circuit 109. The DASP# signal 35 is transmitted to the second state machine circuit 109.

The processing of the controller 13 in FIG. 2 will now be described. First, mainly the operation related to the first state machine circuit 107 will be described. The detector 101 monitors the PCI bus 5 and detects, for example, the indirect access to the frame buffer 9 and/or the graphics device 11 by CPU 1. When, in the address phase of the bus cycle of the PCI bus 5, a value (e.g., 0801_2345) within a memory range (e.g., 0800_0000 to 083F_FFFF) that is allocated for the graphics device 11 is detected in AD [31:0] (address/data bus), it is judged as the access to the frame buffer 9. If the detector 101 detects the access to the frame buffer 9 and/or the graphics device 11 by CPU 1, it outputs a signal to the first counter 103 and to the first state machine circuit 107. The first counter 103 loads a first predetermined value and starts decrementing it. The count value of the first counter 103 is output to the first state machine circuit 107. The first counter 103 loads the first value and decrements it each time the detector 101 detects the access to the frame buffer 9 and/or the graphics device 11 by CPU 1, and outputs a signal.

Figure 3:
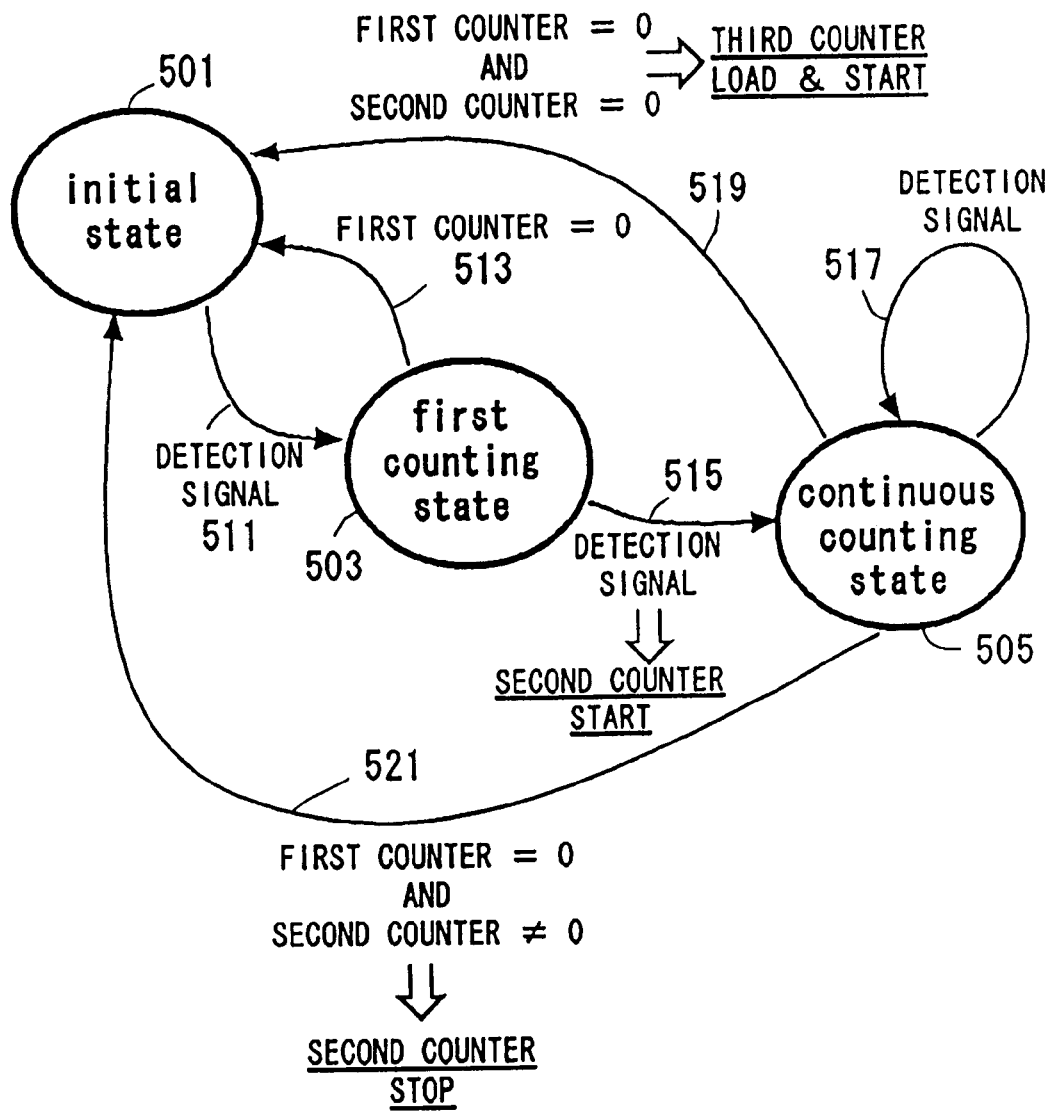
FIG. 3 is a diagram showing state transition for a first state machine circuit 107 in FIG. 2.
Figure 4:
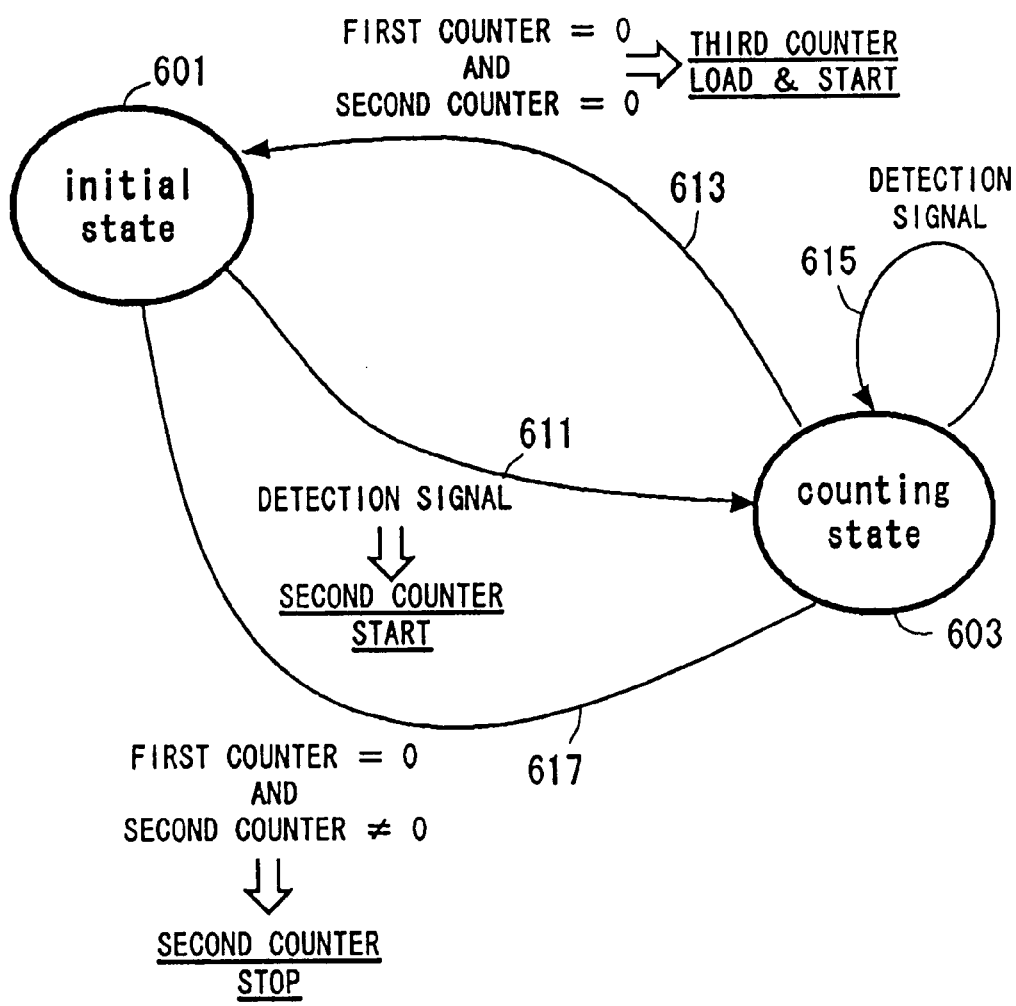
FIG. 4 is a diagram showing state transition for the first state machine circuit 107 in FIG. 2.

The states shown in FIGS. 3 and 4 are provided for the first state machine circuit 107, and transition of these states is performed. In FIG. 3, there are an initial state 501, a first_counting state 503 and a continuous_counting state 505. First, the first state machine circuit 107 is set to the initial state 501. Although a second predetermined count value is loaded into the second counter 105, decrementing is not yet performed. When a detection signal is received from the detector 101 (transition 511), the first state machine circuit 107 is shifted to the first_counting state 503. When this occurs, the first counter 103 begins the decrement of the first count value. If in the first_counting state 503, the value held by the first counter 103 has been decremented and the count is 0, the first state machine circuit 107 returns to the initial state 501 (transition 513). Since the accesses to the frame buffer 9 and/or the graphics device 11 do not succeed, the substantial frequency of the CPU 1 need not be raised. If, in the first_counting state 503, another detection signal is received before the count value held by the first counter 103 is decremented to 0 (transition 515), the first state machine circuit 107 is shifted to the continuous_counting state 505. At the transition 515, the second counter 105 begins to decrement the count value. The first counter 103 reads the first value and again begins to decrement it.

The first state machine circuit 107 remains in this condition while the detection signal is being received (transition 517) in the continuous_counting state 505 except for the case where the count values held by the first and the second counters 103 and 105 are 0, or the count value held by the first counter 103 is 0 and the count value held by the second counter 105 is not 0. This represents a condition wherein CPU 1 frequently accesses to the frame buffer 9 and/or the graphics device 11. The count value held by the second counter 105 is decremented continuously, and when the count value held by the first counter 103 is decremented to 0, even though the count value held by the second counter 105 is not yet 0 (transition 521), the decrement of the second counter 105 is halted and the first state machine circuit 107 is returned to the initial state 501. Since the state is shifted to the initial state 501, the second value is loaded into the second counter 105 and decrementing is halted. This represents a condition where CPU 1 has not accessed to the graphics device 11 and/or the frame buffer 9 for a long time (during the decrement of the second value), and for this condition, the substantial frequency of the CPU 1 need not be raised. As for an event wherein the count values held by both the first and the second counters are 0, a third predetermined value is loaded into the third counter 113, which is then instructed to decrement it. In this state the substantial frequency of the CPU 1 remains high because CPU 1 has frequently accessed the graphics device 11 and/or the frame buffer 9 over a period of time (during the decrement of the second value), but the count value held by the first counter 103 has become 0 so that the period for the high substantial frequency may be terminated soon. The count value held by the second counter 105 has been transmitted to the signal generator 115. When the count value of the second counter 105 is decremented to 0, the signal generator 115 de-asserts the STPCLK2# signal to raise the substantial frequency of the CPU 1.

The third counter 113 decrements the third value. Since the count value held by the third counter 113 is transmitted to the signal generator 115, the signal generator 115 de-asserts the STPCLK2# signal until the count value reaches 0, and then outputs the STPCLK# signal unchanged when the count value becomes 0.

Figure 5:
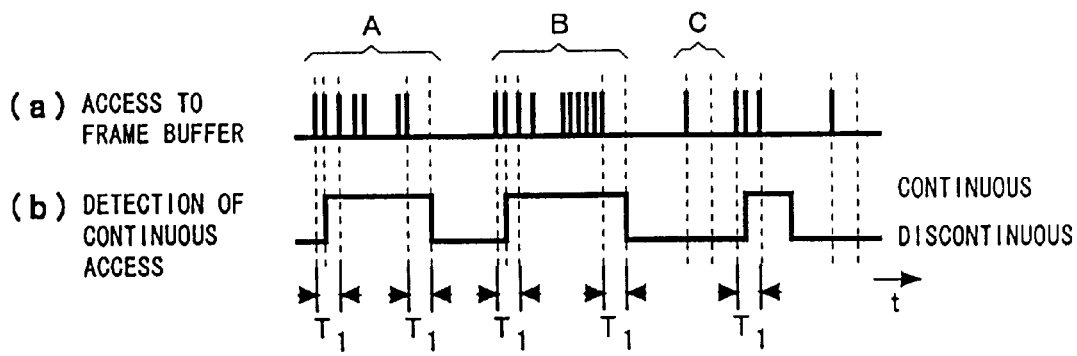
FIG. 5 is a time chart for the first state circuit machine 107, with (a) showing a waveform for accessing a frame buffer, and (b) showing a waveform for detecting succeeding accesses.
Figure 6:
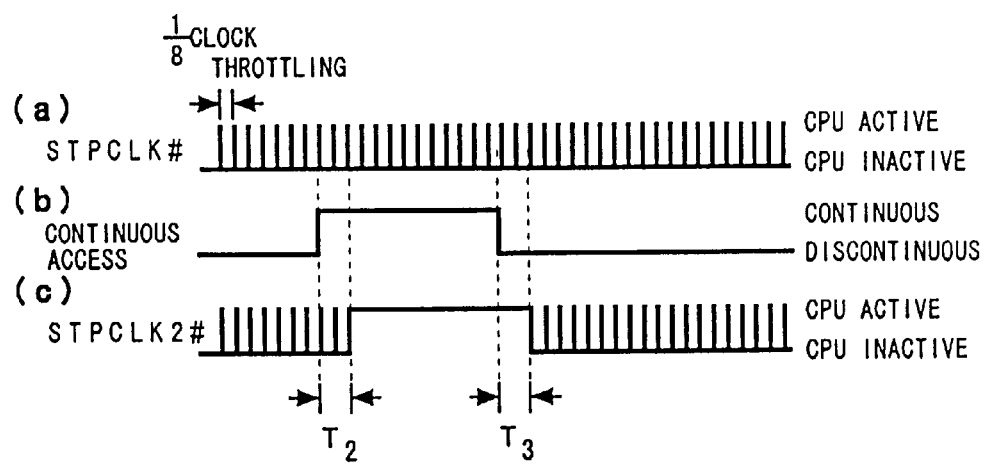
FIG. 6 is a time chart for the first state circuit machine 107, with (a) showing a waveform for a STPCLK# signal, (b) showing a waveform for the detection of succeeding accesses, and (c) showing a waveform for a STPCLK2# signal.
Figure 7:
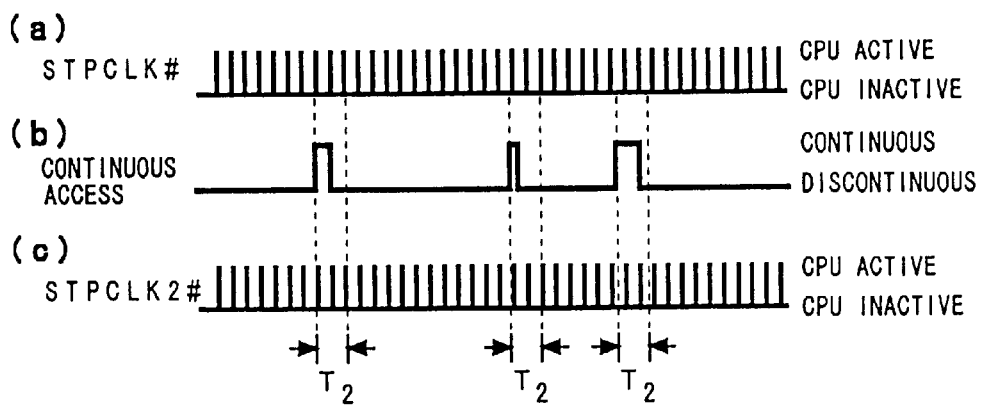
FIG. 7 is a time chart for the first state circuit machine 107, with (a) showing a waveform for a STPCLK# signal, (b) showing a waveform for the detection of succeeding accesses, and (c) showing a waveform for a STPCLK2# signal.

The above described processing is shown in time charts in FIGS. 5 to 7. In FIG. 5(a) are shown periods when the detector 101 detects indirect accesses to the frame buffer 9 by CPU 1 and outputs detection signals. When a detection signal is received again by the first counter 103 in a period (time $T_1$) during which the first counter 103 decrements the first value in response to the first access, it is ascertained that the accesses are succeeding (continuous), and the signal in FIG. 5(b) goes to a high level. Since no detection signal is input during time $T_1$ following the receipt of the last detection signal, the count value held by the first counter 103 reaches 0, and a signal (low) indicating an access discontinuity appears as shown in FIG. 5 (b). Only when the first state machine circuit 107 is in the continuous_counting state 505 in FIG. 3, it is ascertained that the accesses are succeeding (continuous).

It is ascertained that the accesses are performed succeedingly at periods A and B in FIG. 5(a). In period C, however, although the state is shifted to the first_counting state 503 in FIG. 3, the first value is not loaded to the first counter 103 and the count value becomes 0 (transition 513). The state is therefore returned to the initial state 501 and it is ascertained that access is discontinuous.

FIG. 6(a) is the timing chart of the STPCLK# signal, with # indicating it is active low. In (a), ⅛ CPU clock throttling is represented. The CPU 1 is operated when the STPCLK# signal is deasserted, and the CPU 1 is deactivated when the STPCLK# signal is asserted. The ratio of the CPU clock throttling in the present invention is not limited to ⅛, another may be used. In FIG. 6 (b), a period during which the first state machine circuit 107 is in the continuous_counting state 505 is defined as "high" and the other periods are defined as "low." As described above, the second counter 105 begins counting the second value after the succeeding (continuous) accesses are ascertained, and when the count value held by the second counter 105 reaches 0, the signal generator 115 sets the STPCLK2# signal (FIG. 6(c)) to the de-asserted state ("high"). In other words, the CPU 1 is set to the operational state, and in this manner deterioration of usability is prevented. A period during which the second value is decremented to 0 is time $T_2$. When the count value held by the first counter 103 is decremented to 0 after the count value held by the second counter 105 becomes 0, the third counter 113 begins decrementing the third value (transition 519 in FIG. 3). The period during which the third value is decremented to 0 is defined as time $T_3$. As shown in FIG. 6(c), during the time $T_3$ following the termination of the succeeding (continuous) accesses, the CPU 1 is operated, and then the signal generator 115 outputs the STPCLK# signal unchanged for CPU clock throttling.

Signals shown in FIGS. 7(a) and 7(b) are the same as those in FIG. 6. As apparent from FIG. 7(b), however, a period for succeeding (continuous) accesses is shorter than the time $T_2$. Therefore, before the second counter 105 decrements its count value to 0, the count value held by the first counter 103 becomes 0 (transition 521 in FIG. 3). In this condition, the signal generator 115 outputs the STPCLK# signal unchanged because the period during which the CPU 1 is active need not be extended.

The first state machine circuit 107 may have the states shown in FIG. 4 and may perform state transition. A difference in the state transition in FIG. 4 is the absence of the first_counting state 503. In the state transition in FIG. 4, the second counter begins counting upon the output of one detection signal. However, since as soon as the count value held by the first counter 103 reaches 0 the first state machine circuit 107 is returned to the initial state by the transition 617, no particular problem will occur. The other processing is the same as that in FIG. 3, and no explanation for it will be given.

The processing performed when the DASP# signal is not input has been explained, and now the processing performed when the DASP# signal is de-asserted will be explained. Since the disk drive is being accessed in a period during which the DASP# signal is asserted, the substantial frequency of the CPU 1 is not raised. When the DASP# signal is de-asserted, the fourth counter 111 detects it, and loads a fourth predetermined value and begins decrementing it. The de-asserting of the DASP# signal is also detected by the second state machine circuit 109. The operation of the second state machine circuit 109 will be described referring to a state transition diagram in FIG. 8.

The second state machine circuit 109 has an initial state 701, a counting state 703, and an extension state 705. As described above, the second state machine circuit 109 detects the de-assertion of the DASP# signal, and is shifted from the initial state 701 to the counting state 703 (transition 711). At this time, the second state machine circuit 109 outputs a signal to instruct the signal generator 115 to de-assert the STPCLK2# signal. In this case, the substantial frequency of the CPU 1 is raised at least for a period (time $T_4$) during which the fourth counter 111 decrements the fourth value. If an action that will be described later does not occur in the time $T_4$ and the count value held by the fourth counter 111 reaches 0, the counting state 703 is returned to the initial state 701 (transition 713). This means that, since no particular activity occurs after the access to the disk drive, the substantial frequency of the CPU 1 may be raised during a time period required for the processing for accessing the disk drive.

When a specific action occurs while the fourth counter 111 is decrementing the value, the state is changed to the extension state 705 (transition 715). The specific action can be one of an event where a detection signal is received from the detector 101, an event where two detection signals are transmitted succeedingly to the first counter 103 and the second counter 105 begins decrementing the second value, and an event where the count value held by the second counter 105 reaches 0. In the following example, an event where the second counter 105 begins decrementing the second value will be explained. When a specific action occurs during the time $T_4$, a period during which the substantial frequency of the CPU 1 is raised is extended. In this embodiment, the count value held by the first counter 103 reaches 0 (transition 717), and the substantial frequency of the CPU 1 is raised until the time $T_3$ elapses. That is, when the count value held by the first counter 103 becomes 0, the extension state 705 is returned to the initial state 701. The third counter 113 is instructed to decrement the third value. The signal generator 115 monitors the count value held by the third counter 113, and halts the de-asserting of the STPCLK2# signal when the count value becomes 0 and transmits the STPCLK# signal unchanged to the CPU 1.

The transition from the extension state 705 to the initial state 701 may be performed upon the occurrence of an event wherein the count value held by the first counter 103 is decremented to 0 and the count value held by the fourth counter 111 is 0, instead of upon the occurrence of the above described event wherein the count value held by the first counter 103 becomes 0. Further, when the count value of the fourth counter 111 is not 0, even though the count value held by the first counter 103 has reached 0, the second state machine circuit 109 may remain in the extension state 705.

Figure 9:
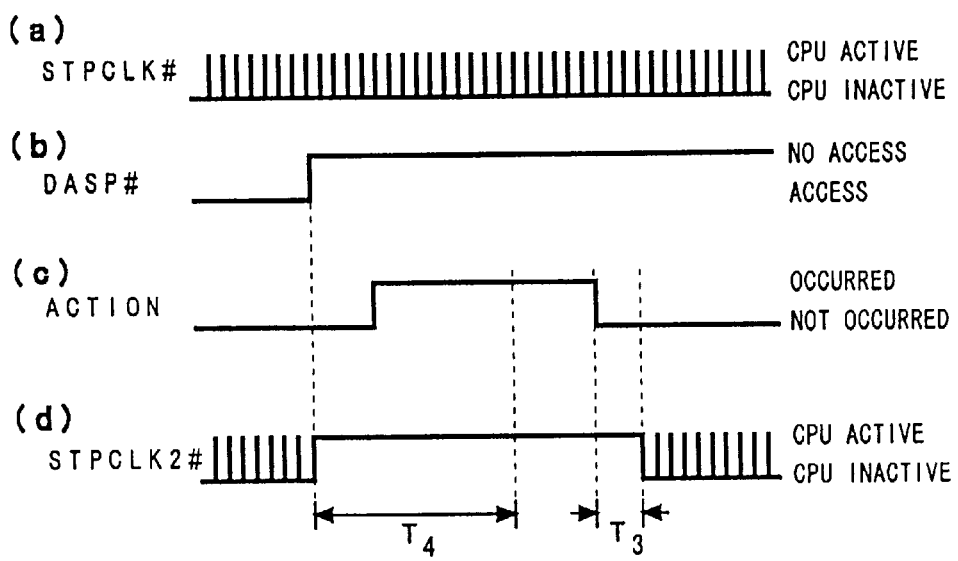
FIG. 9 is a time chart for the second state circuit machine 109, with (a) showing a waveform for a STPCLK# signal, (b) showing a waveform for a DASP# signal, (c) showing a waveform for the detection of succeeding accesses (detection of an action), and (d) showing a waveform for a STPCLK2# signal.

Refer to a time chart in FIG. 9 for the above described operation. FIG. 9 (a) shows the previously mentioned STPCLK# signal. FIG. 9 (b) shows the DASP# signal, and that while at first a disk access is detected, later no disk access occurs. The second state machine circuit 109 outputs a signal to instruct the signal generator 115 to de-assert the STPCLK2# signal (FIG. 9 (d)). FIG. 9 (c) indicates the occurrence of the previously described action. When it is ascertained that accesses to the graphics device 11 and/or the frame buffer 9 by CPU 1 succeed, the level of the action signal goes high. Since this action occurs before the time $T_4$ has elapsed following the de-assertion of the DASP# signal, the second state machine circuit 109 enters the extension state 705. Therefore, a period for the de-assertion of the STPCLK2# signal is extended until the counter value held by the first counter 103 becomes 0. When the count value held by the first counter 103 is decremented to 0, the third counter 113 begins decrementing the third value, and following the expiration of time $T_3$, the STPCLK2# signal is asserted.

When the action (c) in FIG. 9 does not occur, the STPCLK2# signal is de-asserted until the count value held by the fourth counter 111 reaches 0. When the count value is 0, the second state machine circuit 109 outputs a de-assertion halt command to the signal generator 115, which then asserts the STPCLK2# signal.

In the processing concerning the second state machine circuit 109, the substantial frequency of the CPU 1 is not raised in a period during which the DASP# signal is asserted, while the substantial frequency is raised in a period during which the DASP# signal is de-asserted. As a result, it is possible that the peak of the consumed power due to an increase in the revolutions of the hard disk does not overlap the peak of the consumed power that is increased by raising the substantial frequency of the CPU 1.

Although the controller 13 has been explained, this is only one embodiment and the arrangement is not limited to that contained in the above description. In particular, connections in FIG. 2 for the first to the fourth counters, the first and the second state machine circuits and the signal generator 115 are only examples. These components with state machines in FIGS. 3, 4 and 8 can be modified to a circuit that operates as shown in the time charts in FIGS. 5 to 7 and 9. The first and the second state machine circuits can be formed into one module, and can be included in the signal generator 115.

Figure 8:
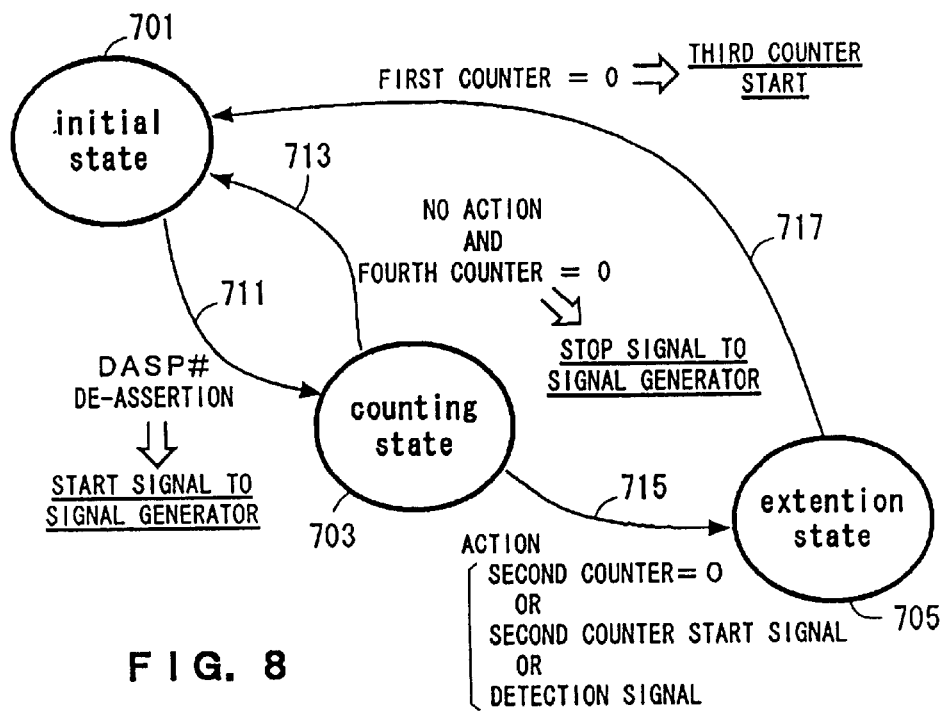
FIG. 8 is a diagram showing state transition for a second state machine circuit 109 in FIG. 2.

Although in FIGS. 3, 4 and 8 the STPCLK2# signal is continuously de-asserted for a designated period of time, the STPCLK2# signal can be modified to de-assert during a period longer than the period during which the STPCLK# signal is de-asserted. It is possible, for example, for the STPCLK2# signal during a designated period to be throttled at a ratio of ⅞ while the STPCLK# signal is throttled at a ratio of ⅛.

An explanation has been given for the case where the graphics device 11 and/or the frame buffer 9 are accessed by CPU 1 after the DASP# signal has been de-asserted. When each activity occurs in the opposite order, the processing of the first state machine circuit 107 may be performed first, or another process may be performed.

In the above embodiment, the detector 101 is so designed that it can detect an access to the frame buffer 9 and/or the graphics device 11. In addition to this, the detector 101 can detect an operation in a group consisting of the same type of operations that are performed by the same type of devices, and can output a detection signal. The times $T_1$ to $T_4$ can be fixed, or can be altered as needed in accordance with different conditions. When the detector 101 can distinguish a plurality of operations, different times $T_1$ to $T_4$ can be output in accordance with the detected operation type. In the above example, PCI bus 5 is monitored to detect an access. However, some means for directly monitoring the operation of the graphics device 11 can be provided.

As for an interrupt for a data transfer request issued by the HDD 17, which frequently occurs while the DASP# signal is asserted, the substantial frequency of the CPU 1 is raised within a short period, such as 100 µs, so that the performance of the data transfer will not be deteriorated. Further, the state is monitored to detect whether it enters the APM idle state, and when the STPCLK# signal is asserted by the APM, the substantial frequency is lowered immediately.

While the implementation of the present invention using hardware has been explained in detail, the present invention can be provided by using software. In a layer structure in FIG. 10, where an OS 803 is installed below applications A to D and a BIOS 804 is installed below the OS 803, a program that executes the same processing as that for the controller 13 in FIG. 2 is included in the OS 803. When the OS 803 receives a screen rewrite request from the applications A to D, or a request for a hard disk access, and the state matches the above described conditions, the OS 803 can control the CPU clock throttling via the BIOS 804. If the OS 803 is notified of an action, such as continuous screen rewriting, by the application A to D, the processing required of the OS 803 can be reduced.

Figure 10:
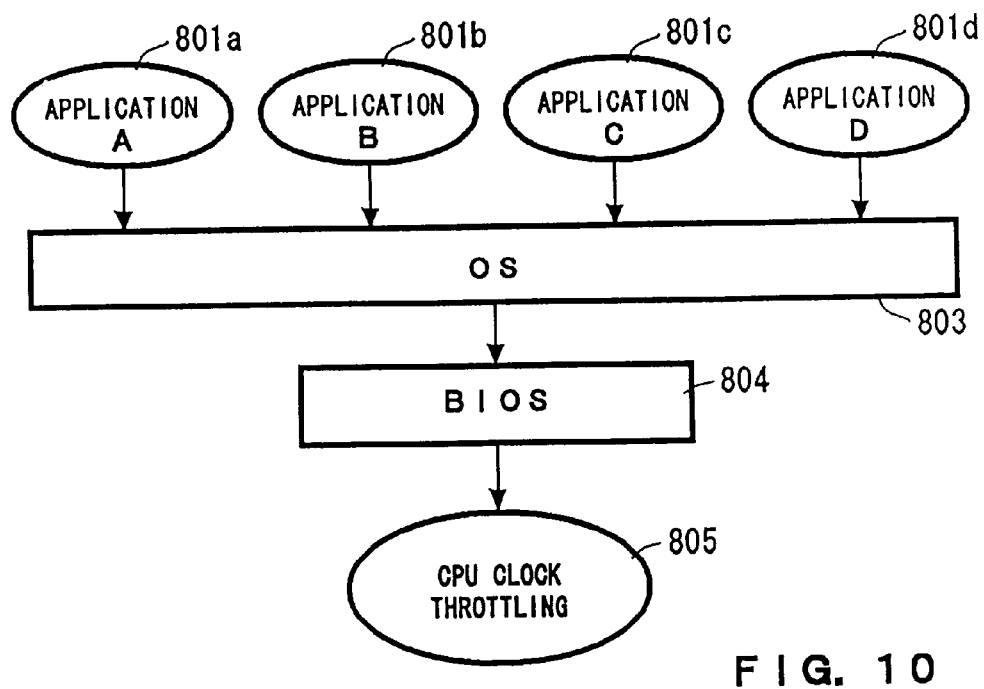
FIG. 10 is a diagram showing one example arrangement using software.

The structure shown in FIG. 10 is only one example, and an arbitrary number of applications is possible. Further, a program for processing involving the controller 13 in FIG. 2 can arbitrarily be provided for either an application, an OS or a BIOS, and arbitrary combinations of programs and other conditions can also be provided.

What is claimed is:

1. A computer system comprising:

a central processing unit; and a controller for raising the substantial frequency of said central processing unit if predetermined activities of a device in the computer system succeed for a predetermined period $t_2$ or longer, each of said predetermined activities occurring within a predetermined interval $t_1$, after the previous predetermined activity; said controller being coupled to a first counter for beginning to count a first predetermined value from a value at an initial state each time a device in said computer system performs a predetermined activity and a second counter for initializing a count value if said first counter has counted said first predetermined value while said first counter is counting said first predetermined value.

2. The computer system according to claim 1, wherein said substantial frequency of said central processing unit is lowered when a predetermined period $t_3$ has elapsed following termination of said predetermined activities, each of which occurs within said predetermined period $t_1$ after the previous predetermined activity.

3. The computer system according to claim 1, wherein said device is a graphics device and wherein said predetermined activity is an access to a predetermined memory address.

4. A computer system comprising:
a disk drive;
a central processing unit; and
a controller for raising the substantial frequency of said central processing unit after the termination of an access to said disk drive, and if a predetermined activity performed by a device other than said disk drive occurs within a predetermined period $t_4$ after the raising of the substantial frequency, for lowering said substantial frequency of said central processing unit when a predetermined period $t_3$ has elapsed following the termination of said predetermined activity, said controller being coupled to a first counter for counting a first predetermined value from a value at an initial state in response to termination of an access to said disk drive and a second counter for, if a predetermined activity of a device other than said disk drive occurs before said first counter has counted said first predetermined value, counting a second predetermined value from a value at an initial state in response to said predetermined activity having been completed.

5. The computer system according to claim 4, wherein, if said predetermined activity does not occur within said predetermined period $t_4$, said substantial frequency of said central processing unit is lowered after said predetermined period $t_4$ has elapsed.

6. The computer system according to claim 4, wherein said predetermined activity is a set of activities performed by a device other than said disk drive, each occurring within a predetermined period $t_1$ after the previous activity performed by said device other than said disk drive.

7. The computer system according to claim 4 or 5, wherein said device other than said disk drive is a graphics device and wherein said predetermined activity is an access of a predetermined memory address.

8. A device for controlling a substantial frequency of a central processing unit in a computer system, comprising:
a first counter for beginning to count a first predetermined value from a value at an initial state each time a device in said computer system performs a predetermined activity;
a second counter for initializing a count value if said first counter has counted said first predetermined value, and for counting a second predetermined value while said first counter is counting said first predetermined value; and
a controller for issuing a command to raise said substantial frequency of said central processing unit if said second counter has counted said second predetermined value.

9. A device for controlling a substantial frequency of a central processing unit of a computer system, comprising:
a first counter for beginning to count a first predetermined value from a value at an initial state each time a device in said computer system performs a predetermined activity;
a second counter for initializing a count value if said first counter has completed counting said first predetermined value, and for beginning to count a second predetermined value at said first counter beginning to count from the value at the initial state before said first counter has counted said first predetermined value after said first counter has counted said first predetermined value and then again begins to count from the value at the initial state by said predetermined activity; and
a controller for issuing a command to raise said substantial frequency of said central processing unit if said second counter has counted said second predetermined value.

10. The device according to claim 8 or 9, further comprising:
a third counter for counting a third predetermined value in response to said first counter having counted said first predetermined value after said second counter has counted said second predetermined value, and
wherein said controller issues a command to lower said substantial frequency of said central processing unit after said third counter has counted said third predetermined value.

11. The device according to claim 8 or 9, wherein said device in said computer system is a graphic device and wherein said predetermined activity is an access to a predetermined memory address.

12. The device according to claim 8 or 9, wherein said first counter includes means for outputting a signal upon each detection of said predetermined activity of said device, and a counter for, in response to said signal, loading said first predetermined value and decrementing said first predetermined value.

13. A device for controlling a substantial frequency of a central processing unit in a computer system including a disk drive comprising:
a first counter for counting a first predetermined value from a value at an initial state in response to termination of an access to said disk drive;
a controller for issuing a command to raise said substantial frequency of said central processing unit in response to the termination of said access to said disk drive; and
a second counter for, if a predetermined activity of a device other than said disk drive occurs before said first counter has counted said first predetermined value, counting a second predetermined value from a value at an initial state in response to said predetermined activity having been completed;
wherein said controller issues a command to lower said substantial frequency of said central processing unit in response to that said second counter having counted said second predetermined value.

14. The device according to claim 13, further comprising:
a third counter for loading a third predetermined value and decrementing said third predetermined value each time a device other than said disk drive performs a predetermined activity; and
a fourth counter for loading a fourth determined value if a count value of said third counter becomes 0, and for decrementing a count value while said count value of said third counter is not 0;
wherein, if said count value held by said fourth counter becomes 0 before said first counter has counted said first predetermined value, said second counter begins to count in response to the count value of said third counter becoming 0.

15. The device according to claim 13, wherein, when a predetermined activity of a device other than said disk drive does not occur until said first counter has counted said first predetermined value, said controller issues a command to lower said substantial frequency of said central processing unit after said first counter has counted said first predetermined value.

16. The device according to claim 13, wherein said device other than said disk drive is a graphic device and wherein said predetermined activity is an access to a predetermined memory address.

17. The device according to claim 13, further comprising means for detecting termination of an access to said disk drive.

18. A method for controlling a substantial frequency of a central processing unit in a computer system, said method comprising the steps of:

determining whether or not predetermined activities of a device in said computer system succeed for a predetermined period $t_2$ or longer, each of said predetermined activities occurring within a predetermined period $t_1$ after the previous predetermined activity said determining comprising beginning to count a first predetermined value from a value at an initial state each time a device in said computer system performs a predetermined activity and initializing a count value if said first counter has counted said first predetermined value while said first counter is counting said first predetermined value; and raising said substantial frequency of said central processing unit if said predetermined activities succeed for said predetermined period $t_2$ or longer.

19. The method according to claim 18, further comprising the steps of:

determining whether or not said predetermined activities of said device have terminated; and lowering said substantial frequency of said central processing unit if said predetermined activities have terminated and a predetermined period $t_3$ has elapsed after the termination.

20. A method for controlling a substantial frequency of a central processing unit in a computer system having a disk drive, said method comprising the steps of:

raising the substantial frequency of said central processing unit after an access to the disk drive;

determining whether a predetermined activity performed by a device other than said disk drive occurs within a predetermined period $t_4$ after termination of said access to the disk drive, said determining comprising counting a first predetermined value from a value at an initial state in response to the termination of said access to said disk drive, and if a Predetermined activity of a device other than said disk drive occurs before reaching said first predetermined value, counting a second predetermined value from a value at an initial state in response to said predetermined activity having been completed; and lowering said substantial frequency of said central processing unit after a predetermined period $t_3$, following said predetermined activity, has passed if said predetermined activity has occurred.

21. The method according to claim 20, wherein said predetermined activity is a set of activities of a device other than said disk drive, each of which occurs within said predetermined period $t_1$.

22. The method according to claim 20, wherein said predetermined activity is a set of activities of a device other than said disk drive, each of which occurs within said predetermined period $t_1$, and said activities succeed for said predetermined period $t_2$ or longer.

23. A method for controlling a substantial frequency of a central processing unit in a computer system having a disk drive, said method comprising the steps of:

raising the substantial frequency of said central processing unit after an access to the disk drive;

determining whether a predetermined activity performed by a device other than said disk drive occurs within a predetermined period $t_4$ after termination of said access to the disk drive, said determining comprising counting a first predetermined value from a value at an initial state in response to the termination of said access to said disk drive, and if a predetermined activity of a device other than said disk drive occurs before reaching said first predetermined value, counting a second predetermined value from a value at an initial state in response to said predetermined activity having been completed; and lowering said substantial frequency of said central processing unit if a longer period of either a predetermined period $t_3$ following termination of said predetermined activity of said predetermined period $t_4$ has passed.

\* \* \* \* \*